UNITED STATES PATENT OFFICE.

FRITZ POLLAK, OF BERLIN, GERMANY.

METHOD OF PRODUCING INSOLUBLE CONDENSATION PRODUCTS AND PRODUCT THEREOF.

1,216,728.      Specification of Letters Patent.      Patented Feb. 20, 1917.

No Drawing.      Application filed September 14, 1910. Serial No. 581,988.

*To all whom it may concern:*

Be it known that I, FRITZ POLLAK, a citizen of the Empire of Austria-Hungary, residing at Berlin, in the Kingdom of Prussia, German Empire, have invented certain new and useful Improvements in the Method of Producing Insoluble Condensation Products and Product Thereof; and I do hereby declare the following to be a full, clear, and exact description of the invention, such as will enable others skilled in the art to which it appertains to make and use the same.

Kleeberg (*Liebig's Ann. Chem.*, 263 pag. 283) has found, that if a large quantity of mineral acids reacts on a mixture of phenol and formaldehyde a pink colored resinous substance is formed. This product, although insoluble in the usual solvents, cannot be used for technical purposes on account of its sponginess and lack of homogeneity. Nor could Kleeberg's process be practised on a large scale, as it is of an explosive character.

The present invention relates to the production of insoluble products by the catalytic action of acids, but in a proper technical condition. I have discovered, that the quantity of acids, which Kleeberg—according to his description of the process—must have used, will have to be considerably diminished, when it is desired to form compact and homogeneous masses on a large scale, suitable for technical purposes.

Furthermore I have found that the pink color of Kleeberg's products is not a necessary property of these products, but is solely due to the presence of a too great excess of acid and that when the quantity of acid employed does not exceed 1-2% of the end product, perfectly white or slightly brownish or yellowish colored opaque masses will be formed, which are very similar to ivory in their appearance and qualities. The quantity of acid used, therefore, determines the color of the product. They may be cut, stamped, bored, filed or polished and are on account of their toughness and hardness of great technical value.

I have also discovered that these insoluble products are not the condensation products which are first obtained, but that in a first step soluble or partly soluble resins may be formed, which by the further action of formaldehyde or heat are transformed into the insoluble condensation-products. By means of my invention it is possible to isolate these intermediary products, to shape them, to compound them with other substances and finally to transform them into the insoluble mass desired. This present invention relates also to the production of articles consisting of the latter or containing the same.

Insoluble condensation-products of phenols and formaldehyde have hitherto been formed by the condensing action of bases or salts. The products obtained in this manner are not identical with the products, forming the object of the present invention, as they are transparent and of a deep yellow, brown or red color.

The manner of working the new process may be considerably varied according to the properties of the acids employed or to their quantity or to the results sought, the essential point being to regulate the quantity of acid, so as to secure the products of the kind before mentioned.

As is well known, the power and rapidity with which dissolved substances interact is often dependent upon the relative concentrations of the dissolved substances. As can be seen from the examples, the percentage of acid used does not cause the reaction between the dissolved crystallized phenol and the ordinary 40% solution of formaldehyde below 100° C.

*Example I.*—18.8 parts of crystallized phenol, 8.73 parts of paraformaldehyde and 0.04 parts of para phenolsulfonic acid (dissolved in water) are warmed up on a waterbath, until the paraformaldehyde has dissolved. When this point is reached and the reaction takes place the temperature of the liquid rises slightly over 100° C. At the same time the mass boils up and gains a resinous appearance. It may now be poured into suitable molds, in which it becomes hard and insoluble at about 100° C. It forms now a compact mass, which on its surface shows a pink color, but is white inside.

*Example II.*—100 parts of crystallized phenol, 125 parts of formaldehyde 40% and 0.30 parts of hydrochloric acid (1.19 specific weight) may be mixed and evaporated in a suitable vessel with stirrer on a waterbath, the temperature of which, as is well known, is below 100° C. When about 60 parts have evaporated, a reaction sets in and the temperature of the liquid rises somewhat over 100° C. Some time after, a white precipitate will be separated from the clear solution. To this I add while stirring about 30 parts of water and evaporate this again at about 75° C. The mass is now ready to be filled into molds, which I heat up to 70–80° C. until the product becomes elastic, when warm. When then the temperature is gradually increased from 80 to 125° C. a perfectly hard and homogeneous mass will be formed. When drawn it shows accurately the dimensions of the mold employed. It is slightly reddish on its surface, but white inside.

*Example III.*—A mixture of 100 parts of crystallized phenol, 250 parts of formaldehyde (45%) and 0.3–0.8 parts of hydrochloric acid (1.19 specific weight) are evaporated on a waterbath and worked up in a similar way to the one described in the examples I and II. The mass, which I obtain,—although containing traces of free formaldehyde—is without any smell when worked up. It is compact, white, insoluble, hard and tough, thus forming an excellent substitute for ivory.

When the oxidation of the surface of these products is objectionable, one may carry out the process in an atmosphere of inert gas, for instance nitrogen, hydrogen, carbonic acid or the like. Sometimes it may be advisable to use for the same purpose a closed vessel with or without pressure.

The mode of application or compounding of the condensation product depends upon the results desired. As mentioned above I may interrupt the process at any stage and the product will remain unchanged for a long time, when cooled down. It may then (either as a liquid or in a resinous state or—when the process has further progressed—as a powder) be mixed with other substances such as asbestos, graphite, sand, powdered metals, tar, resins, oils, colors, pigments, cellulose, acetylcellulose or the like. The mixture may be pressed into molds hot or cold and hardened up afterward at temperatures over 100° C.

The word phenol mentioned in this description designates not only the first representative of the phenolic series but also its homologues. I may for instance use the so called crude carbolic acid 95/100, which is a mixture of cresols and contains from 95% to 100% of cresols. In this case I remove the small quantity of basic substances contained in it and use the purified product in the way described in the examples. The insoluble products formed therewith are very similar to those obtained out of pure phenol. They form compact, white or slightly yellowish colored masses and may be cut, stamped, bored or polished when hard or worked up in an intermediate liquid or viscous state.

The amount of formaldehyde to be used is not limited to the quantities given above, but may be varied, if desired, but more than equimolecular quantities should be preferably used. When evaporated it may be regenerated by the well known suitable means.

I claim—

1. The process herein described of producing compact, opaque, insoluble, infusible, white to yellowish-colored condensation products of phenols and formaldehyde, which consists in reacting on a body of the phenolic series with more than an equimolecular quantity of the formaldehyde in the presence of so small a quantity of acid that whitish, intermediate products are first formed, and then rendering these white, intermediate products insoluble.

2. A method of producing homogeneous white to yellowish opaque insoluble and ivory-like products from phenol and formaldehyde in the presence of an acid, which consists in causing concentrated formaldehyde to react upon a dissolved phenol in the presence of said acid, the quantity of said acid being insufficient to start said reaction when said formaldehyde is diluted to form a 40% solution, said substances being maintained at a temperature below 100° C. until said reaction has taken place, whereby a fusible and soluble intermediate product is formed, and then changing said soluble and fusible intermediate product to an insoluble and infusible product, as described.

3. A method of producing homogeneous white to yellowish opaque insoluble and ivory-like products from phenol and formaldehyde in the presence of an acid, which consists in making a solution having a temperature below 100° C., said solution consisting of a mixture of phenol and of 40% formaldehyde and said acid, the quantity of said acid being insufficient to start the reaction between the phenol and the formaldehyde, concentrating said solution at a temperature below 100° C. until reaction sets in, whereby a soluble and fusible intermediate product is obtained, and then converting said soluble and fusible intermediate product into an infusible and insoluble product.

4. In the art of producing homogeneous white to yellowish opaque insoluble and ivory-like products from phenol and formaldehyde in the presence of an acid, that step in the art which consists in causing the formaldehyde and phenol to react at a temperature below 100° C. in the presence of an acid, the quantity of said acid being so small that a white soluble, fusible product is formed.

5. The process herein described of producing articles of compact, insoluble condensation products of phenols and formaldehyde, which consists in reacting on a body of the phenolic series with more than an equimolecular quantity of formaldehyde in the presence of so small a quantity of acid so that soluble, white, intermediate products are first formed, isolating said soluble, white, intermediate products, forming articles with the said products, and rendering them insoluble by the influence of heat.

6. As a new manufacture, a compact, insoluble, infusible, white to yellowish colored opaque condensation product of phenols and formaldehyde containing a small amount of acids.

In testimony, that I claim the foregoing as my invention, I have signed my name in presence of two subscribing witnesses.

FRITZ POLLAK.

Witnesses:
  HENRY HASPER,
  WOLDEMAR HAUPT.